United States Patent [19]

Bernardi

[11] Patent Number: 4,924,961
[45] Date of Patent: May 15, 1990

[54] VEHICLE FOR GARDENING AND AGRICULTURAL WORK

[75] Inventor: Guido Bernardi, Milan, Italy
[73] Assignee: BCS S.p.A., Milan, Italy
[21] Appl. No.: 211,840
[22] Filed: Jun. 27, 1988

[30] Foreign Application Priority Data

Jul. 10, 1987 [IT] Italy .................. 21248 A/87

[51] Int. Cl.$^5$ .............................................. B60K 17/00
[52] U.S. Cl. .................................. 180/374; 180/376; 280/787; 280/797; 475/204; 475/327
[58] Field of Search ............... 280/786, 787, 797, 798; 180/75.1, 374, 376; 74/792

[56] References Cited

U.S. PATENT DOCUMENTS 2,305,305 12/1942 Porsche ............................. 280/787
3,954,028 5/1976 Windish ............................ 74/792
4,738,326 4/1988 Inoue ................................ 180/75.1
4,746,145 5/1988 Furuichi et al. .................... 280/786

FOREIGN PATENT DOCUMENTS 501107 2/1939 United Kingdom ................ 280/786

Primary Examiner—Kenneth R. Rice
Attorney, Agent, or Firm—Hedman, Gibson, Costigan & Hoare

[57] ABSTRACT

The invention relates to a vehicle for gardening and agricultural work provided with four wheels, of which at least two are drive wheels, and an engine, comprising a frame consisting essentially of a longitudinally extending beam preferably of hollow box section and internally housing the drive shaft or shafts. It is provided with a least one power take-off, and preferably two, of which one is at the front and one is at the rear. The vehicle is preferably provided with a steering handlebar and a seat for the operator. Preferably, the engine is positioned at the rear and at least the front wheels are drive wheels. The vehicle is provided with a gearbox and preferably a separate quick-reversing mechanism. This mechanism and the gearbox are housed in casings preferably disposed on the axis of the beam-frame to form a structural part thereof.

The vehicle is suitable for fast travel on and off the road and for use as a vehicle without the addition of implements.

14 Claims, 4 Drawing Sheets

VEHICLE FOR GARDENING AND AGRICULTURAL WORK

This invention relates to a vehicle usable for gardening and agricultural work and capable of fast travel both on and off the road.

Agricultural engineering has seen the development of a large number of machines for specific agricultural operations. Many of these machines are large and costly, slow-moving and mostly specialised for just one or a few specific operations. Others are smaller and inexpensive, but again are incapable of fast travel and are mostly operated by an operator who follows then on foot. Agricultural implements can be operated from tractor power takeoffs, but again there are serious cost, speed and operability limitations.

An object of the present invention is to provide a light, economical vehicle of simple structure which is simple to operate and fast-moving both on and off the road, and by which, when connected to suitable known implements which do not require further description, can perform a large variety of gardening and agricultural operations.

A further object of the invention is to provide a vehicle of this type which is of particularly simple and efficient design and consequently light and economical while being of overall robustness and reliability.

A further object of the invention is to provide a vehicle of the kind referred to above, which can be equipped with two power take-offs, front and rear, so as to make possible a wide variety of gardening and agricultural operations.

A further object, in a preferred embodiment of the invention, is to provide a vehicle which can be reversed in particularly simple and fast manner.

A further object of the invention is to provide a vehicle which can be used conveniently as such when not used for gardening or agricultural operations.

Further objects and advantages of the invention will be more apparent from the following description.

In its general form the vehicle according to the invention, provided with four wheels, of which at least two are drive wheels, and an engine, is characterised by comprising a frame consisting essentially of a longitudinally extending beam preferably of hollow box section and internally housing the drive shaft or shafts. It is provided with at least one power take-off, and preferably two, namely one at the front and one at the rear. The vehicle is preferably provided with handlebar steering and a seat for the operator.

· Preferably, the engine is positioned at the rear and at least the front wheels are drive wheels.

The vehicle according to the invention is provided with a gearbox and preferably a separate quick-reversing mechanism. This mechanism and the gearbox are housed in casings preferably disposed on the axis of the beam-frame to form a structural part thereof.

The quick-reversing mechanism, the structure and operation of which will be more apparent from the description of a preferred embodiment, comprises a drive shaft disposed axially to the mechanism and carrying a sun gear, planet gears meshing with the sun gear and idle on planet carrier shafts mounted to undergo revolution about the axis of the mechanism, an external ring gear carrying a driven gear which transmits motion to the drive wheels, and a friction clutch device which during forward travel is arranged to lock the planet carrier shafts relative to the ring gear, means for releasing these relative to the ring gear and thus interrupt the linkage between the ring gear and drive shaft to produce the idle position, and means for blocking the revolution of the planet carrier shafts about the mechanism axis to cause the planet gears to rotate on their shafts and consequently the ring gear and driven gear to rotate in the reverse direction to the rotation of the drive shaft. Passage from the forward running to the idle position and from the idle position to the reverse running position is preferably done by an operator operating a lever by means of a pedal or a hand lever.

Further preferred characteristics of the invention will be apparent from the following description of a preferred embodiment thereof.

A preferred embodiment of the invention is illustrated on the accompanying drawings, in which.

Figure 1:
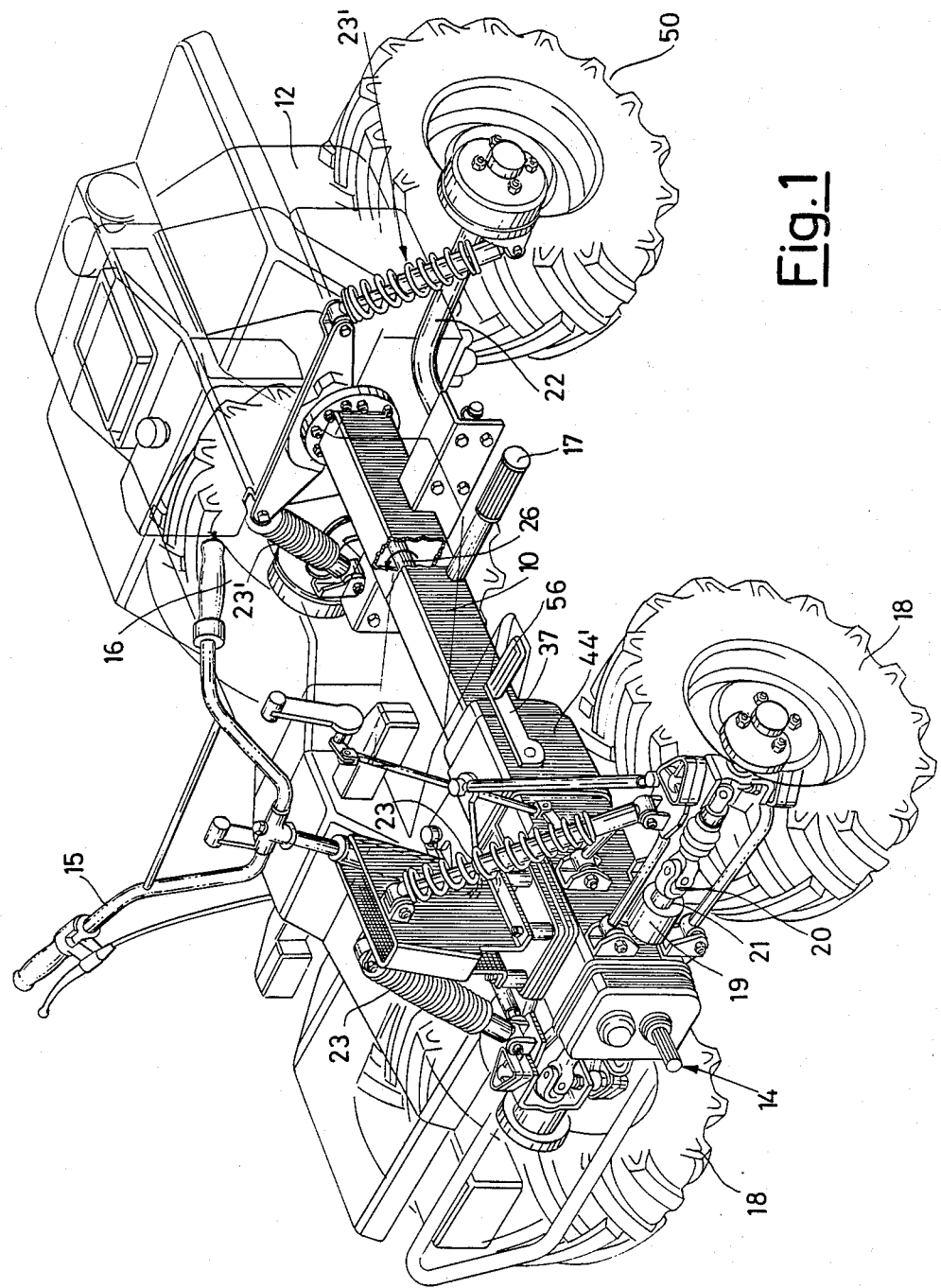
FIG. 1 is a diagrammatic perspective view of a vehicle according to the invention provided with two front drive wheels.

With reference firstly to FIG. 1, the vehicle comprises a frame consisting essentially of a central beam 10 preferably of hollow box section and internally housing the shafts and transmission members. In the figure a part of the wall of the beam 10 is removed to show the shaft 26 which extends from the engine. The engine 12, of any convenient type but preferably a single or two-cylinder petrol or diesel engine, is positioned at the rear and connected to the shaft 26.

A rear power take-off is connected to the shaft of the engine 12, and a front power take-off 14 is positioned at the front end. A handlebar 15 is used for steering, and in the rear of the vehicle there is provided a seat 16 for the driver, whose feet rest on fixed pedals 17. The two front drive wheels 18 are mounted on rocker arms 21 hinged to the sides of the gearbox and are rotated by axles 19 provided with universal couplings 20, whereas the rear wheels 50 are idle and mounted on fixed axles 22. The reference numerals 23 and 23' indicate the elastic suspensions for the front and rear wheels respectively. The front wheels are also steerable wheels, and can be steered by a steering mechanism of any convenient structure which transmits the rotation of the handlebar to the wheels by way of struts and ties.

Figure 3:
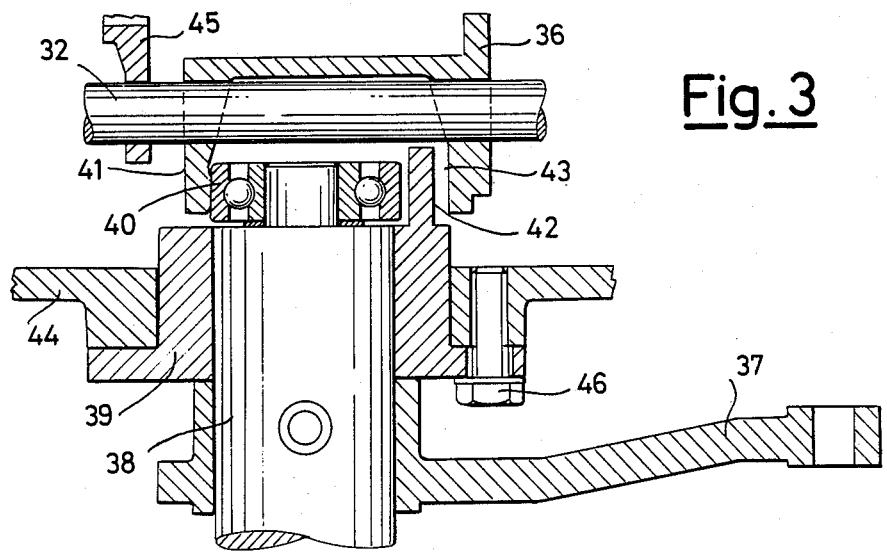
FIG. 3 is a diagrammatic axial section through a control device for the mechanism of FIG. 2.
Figure 4:
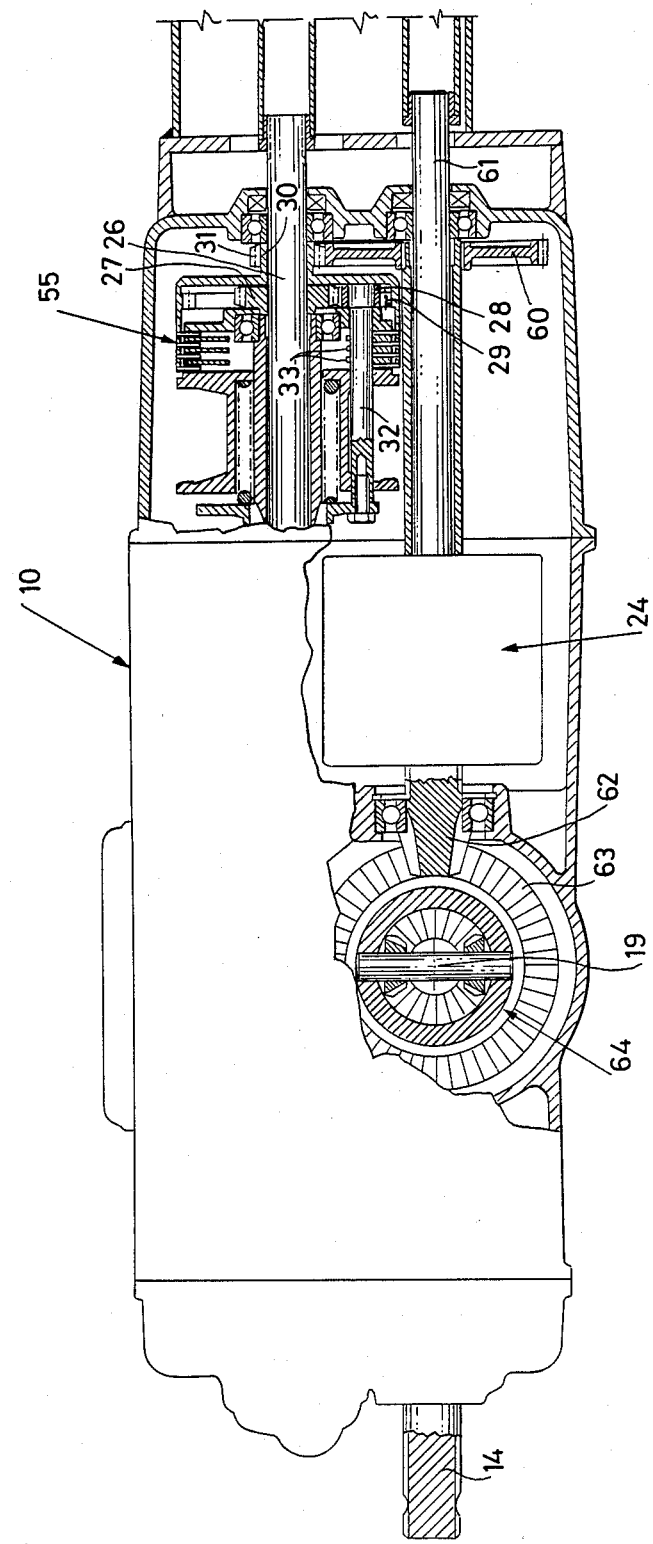
FIG. 4 is a diagrammatic axial section taken on the line 4—4 of FIG. 1 but interrupted for ease of illustration, showing the beam forming the machine frame, the transmission members, the gearbox and the front power take-off.

As can be seen in FIG. 4, the drive shaft 26 originating from the engine passes through and operates a clutch and quick-reversing device indicated overall by 55 and described in detail with reference to FIGS. 2 and 3. A gear 31 which receives motion from said device 55 engages with a gear 60 fixed onto a countershaft 61. This latter drives the shaft 19 of the front wheels by way of a gearbox indicated overall by 24 and of any known type, and by way of a pinion 62-bevel gear 63 and a differential device of any convenient structure indicated overall by 64. Said countershaft 61 also operates the rear wheels if these are drive wheels. The shaft 26 extends beyond the device 55 into the front part of the beam 10, not shown in the sectioned part of FIG. 4, to operate the front power take-off 14 in any convenient manner.

Figure 2:
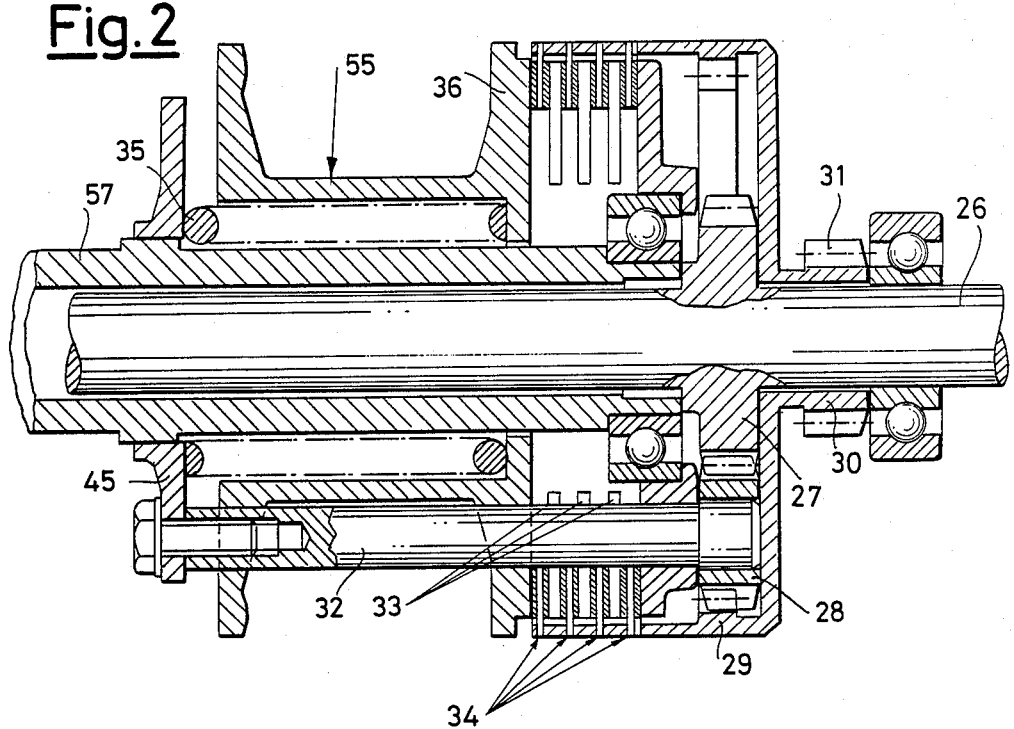
FIG. 2 is a diagrammatic axial section through a preferred form of a mechanism which acts as a friction clutch and travel reverser according to the invention.

FIG. 2 is a similar sectional view but to a larger scale of the clutch and quick-reversing device 55. The shaft 26 from the engine is rigid with a sun gear 27 which engages a certain number of planet gears 28, for example three, of which only one is shown in FIG. 2. These engage a cup-shaped ring gear 29 which extends in the form of a sleeve 30 carrying the aforesaid gear 31, which operates the gear 60 and the countershaft 61. The planet gears 28 are mounted idle on planet-carrier shafts 32 which are rigid with discs 33.

The ring gear 29 is rigid with discs 34 provided with a lining. A spring 35 resting against the plate 45 urges a plate 36 towards the right as shown in FIG. 2, this latter being axially slidable on a cylindrical member 57 housing the shaft 26. The planet-carrier shafts 32 pass through the plate 36 and consequently while this latter rotates, and together therewith, they undergo a revolutionary movement about the longitudinal axis of the device. A control device shown in FIG. 3 enables the elastic force of the spring to be overcome and the plate 36 to be pushed towards the left.

The control device comprises a lever 37 which can be rotated by a pedal control 56 shown in FIG. 1.

Rotating the lever results in rotation of a pin 38 which is rigid with it and housed in the bush 39 fixed by screws 46 to the gearbox 44, a fragment of which is shown at 44'.

This rotation of the pin 38 results in leftward movement (with respect to the figures) of the bearing 40 which is carried by the pin 38 and is in contact with the portion 41 of the plate 36. The bush 39 has a projection 42 facing a part 43 of the plate 36. The operation of the described device is as follows. When the vehicle is under forward travel the various parts of the mechanism are in the positions shown in the figures. The plate 36, urged by the spring 35, presses together the lined discs 34 rigid with the ring gear 29 and the discs 33 rigid with the planet-carrier shafts. The entire epicyclic mechanism then rotates as a single body together with the sun gear 27, and thus the rotation of the shaft 26 is transmitted directly to the gear 31, the speed of rotation being determined by the engine r.p.m.

If the control lever 37 is rotated, the pin 38 rotates and the bearing 40 moves towards the left to urge the plate 36 in the same direction and compress the spring 35. Pressure on the discs 33 and 34 ceases, and consequently the linkage between the shaft 26 and ring gear 29 is interrupted. The clutch is therefore disengaged, and the gear 31 which drives the wheels stops although the shaft 26 continues to rotate.

As the lever 37 is turned further, the plate 36 moves further towards the left until its part 43 comes into friction contact with the part 42 of the bush 39, which is at rest. Consequently the plate 36 also stops and the planet-carrier shafts 32 are halted. As these are now at rest, the planet gears 28 rotate about their axes entrained by the sun gear 27, and compel the ring gear to rotate in the opposite direction to the sun gear and shaft 26. The gear 31 also rotates in the opposite direction to the shaft 26 to produce reverse travel without moving or shifting any gear. This travel reversal can be done with the gearbox in any of its positions and thus in any gear ratio. The device as described would be incorporated in a preferred embodiment of the invention. It can however be replaced by mechanical equivalents available to the expert of the art on the basis of the present description, and in the most general form of the invention it could be dispensed with and a conventional gearbox with a reverse gear be used.

Figure 5:
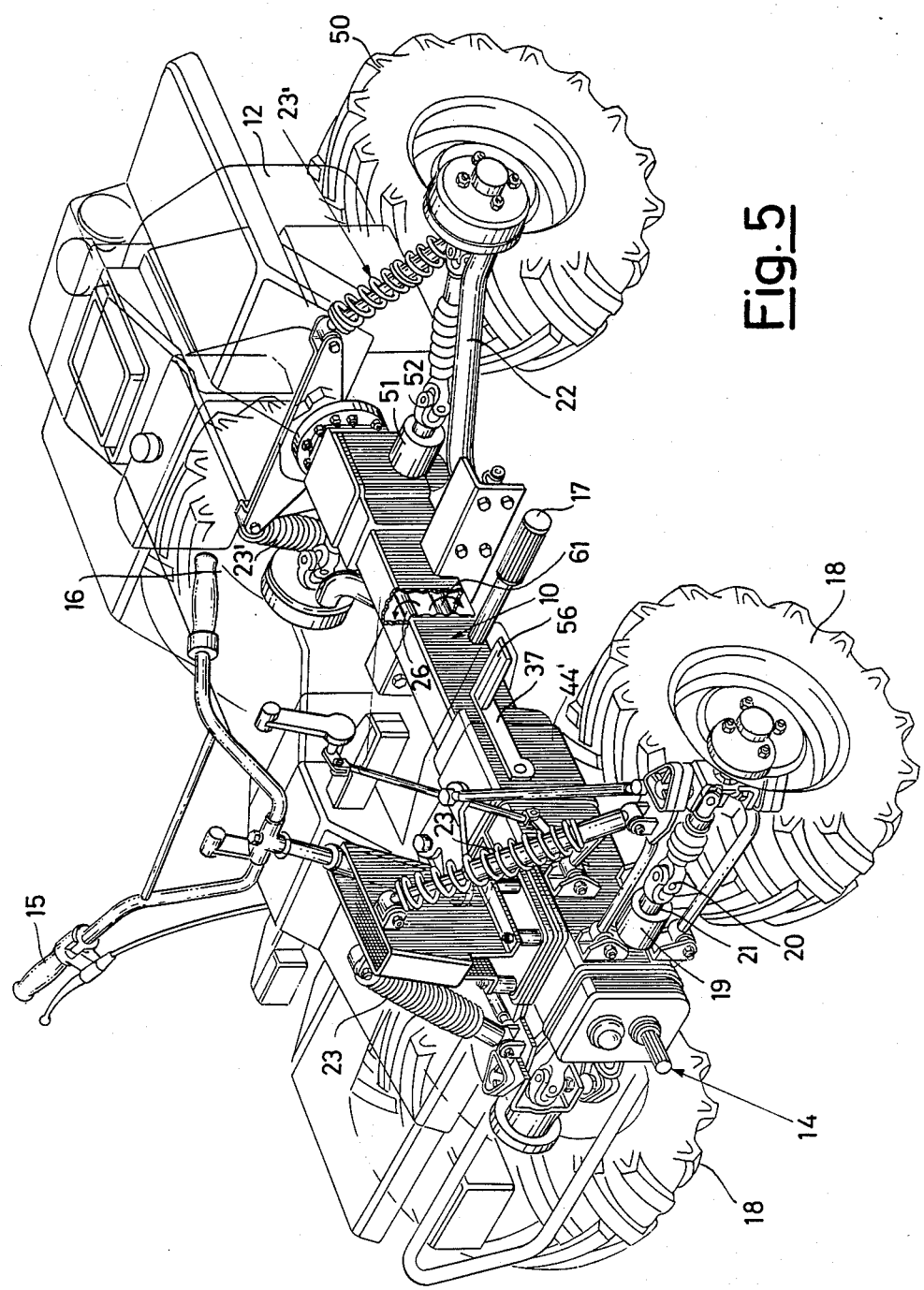
FIG. 5 is a perspective view similar to FIG. 1 but showing a modified embodiment of the vehicle according to the invention, provided with four drive wheels.

FIG. 5 shows the modified embodiment of the invention, in which the four wheels are indicated by the same reference numerals as heretofore. Axles 51 for rotating the rear wheels 50 are present, each provided with a universal coupling 52. In FIG. 5 the beam-frame 10 is interrupted to show the two shafts 26 and 61. The vehicle according to the invention can be used for a large variety of gardening and agricultural operations by virtue of its power take-offs and its flexibility. It can be provided with a servocontrol for raising implements.

A lever-controlled clutch is provided for the power take-offs. For garden work, for example, the vehicle when fitted with a suitable implement can operate as a frontal or central lawn mower or as a frontal snow remover. For forage collection it can be fitted with a cutter bar at its front, a side-delivery rake at its front and a tedder at its rear. For other agricultural work it can be connected to a cutter at its rear, a plough at its front, a trailer, pumps, seeders etc. All the devices and accessories required for these operations are conventional and well known and can be connected to any power take-off, and are therefore not described.

The vehicle itself is suitable for fast travel on and off the road and for use as a vehicle as such without any additional implements being fitted.

Because of its specially designed simple and robust structure it is efficient, safe, strong and economical. Its manoeuvrability is exceptional, especially when provided with the quick-reversing device. It therefore represents considerable progress in agricultural engineering.

I claim:
1. A vehicle for gardening and agricultural work, comprising:
    (a) a frame comprising a beam extending longitudinally to the vehicle, said beam having a hollow cross section;
    (b) an engine connected to said frame;
    (c) a drive shaft operatively connected to said engine and housed within said hollow beam;
    (d) a quick-reverse mechanism operatively connected to said drive shaft and housed within said hollow beam;
    (e) a countershaft operatively connected and actuated by said quick-reverse mechanism, said countershaft being parallel to said drive shaft and housed within said hollow beam;
    (f) a gear box operatively connected to said countershaft and housed within said hollow beam;
    (g) a differential device operatively connected to said gearbox;
    (h) four axles operatively connected to the vehicle wherein at least one front wheel axle is operatively connected to said differential device;
    (i) four wheels operatively connected to said four axles, at least two of said four wheels being drive wheels; and
    (j) at least one power takeoff operatively connected and actuated by said engine.
2. A vehicle as claimed in claim 1, wherein the countershaft actuates the rear wheels.

3. A vehicle according to claim 1, comprising two power takeoffs actuated by the engine.

4. A vehicle according to claim 1, wherein the hollow beam supports the wheels through two supporting arms.

5. The vehicle of claim 1 further comprising means for transmitting motion from said drive shaft to said rear wheels.

6. The vehicle of claim 1 wherein said four wheels are driven.

7. The vehicle of claim 1 wherein said quick reversing mechanism further comprises a drive shaft disposed axially to said quick reversing mechanism and said quick reversing mechanism further includes:
   (a) a sun gear attached to said drive shaft;
   (b) planet gears engaging with said sun gear;
   (c) planet carrier shafts idly mounting said quick reversing mechanism which revolve about the axis of said quick reversing mechanism;
   (d) an external ring gear engaging said planet gears;
   (e) a driven gear attached to said external ring gear for transmitting motion to said drive wheels; and
   (f) a friction clutch for locking said planet carrier shafts to said ring gear to rotate said quick reversing mechanism rigidly with said drive shaft during forward travel.

8. The vehicle of claim 1 further comprising means for releasing the planet carrier shafts relative to the ring gear and thus interrupt the linkage between said ring gear and said drive shaft for setting said mechanism in an idle position.

9. The vehicle of claim 1 further comprising means for stopping said planet carrier shafts rotation about said axis of said quick reversing mechanism so said sun gear rotates said planet gears on said planet carrier shafts so said ring gear and said driven gear rotate in the reverse direction of said drive shaft to reverse the vehicle.

10. The vehicle of claim 1 wherein said friction clutch further comprises:
    (a) a plurality of first lined discs rigid with said ring gear;
    (b) a plurality of second discs rigid with said planet carrier shafts; and
    (c) a presser element including a spring for axially pressing said first discs together so that they become mutually rigid by friction.

11. The vehicle of claim 1 further comprising means for axially displacing said presser element against said spring for removing the pressure on said discs and releasing said first discs from said rigid engagement with said second discs.

12. The vehicle of claim 1 further comprising:
    (a) a member engaged with said planet carrier shafts rotatable about the axis of said quick reversing mechanism in synchronism with said planet carrier shaft rotation; and
    (b) means for bringing said member into engagement with a fixed element of said quick reversing mechanism so that the motion of said member is arrested and said plant carrier shafts revolution is halted so said planet gears rotate on their respective planet carrier shafts due to engagement with said gun gear.

13. The vehicle of claim 1 wherein said member engaged with said planet carrier shafts is said presser element subjected to the force of said spring.

14. The vehicle of claim 1 further comprising a control lever acting on said presser element or on said member engaged with said planet carrier shafts for operating said quick reversing mechanism.

* * * * *